United States Patent [19]

Wiese et al.

[11] Patent Number: 4,990,189
[45] Date of Patent: Feb. 5, 1991

[54] IRON OXIDE PIGMENTS, A PROCESS FOR THEIR PREPARATION AND THEIR USE

[75] Inventors: Jürgen Wiese; Axel Westerhaus; Jürgen Scharschmidt; Gunter Buxbaum, all of Krefeld, Fed. Rep. of Germany

[73] Assignee: Bayer Aktiengesellschaft, Leverkusen, Fed. Rep. of Germany

[21] Appl. No.: 364,052

[22] Filed: Jun. 8, 1989

[30] Foreign Application Priority Data

Jun. 24, 1988 [DE] Fed. Rep. of Germany ....... 3821342

[51] Int. Cl.$^5$ .............................................. C09C 1/22
[52] U.S. Cl. ..................................... 106/456; 106/459
[58] Field of Search ................................ 106/456, 459

[56] References Cited

U.S. PATENT DOCUMENTS

| | | | |
|---|---|---|---|
| 3,533,820 | 10/1970 | Lewis et al. | 106/456 |
| 3,826,667 | 7/1974 | Cohen et al. | 106/456 |
| 3,836,378 | 9/1974 | Hahnkamm et al. | 106/456 |
| 3,946,103 | 3/1976 | Hund | 106/456 |
| 4,024,323 | 5/1977 | Versteegh et al. | 429/249 |
| 4,115,106 | 9/1978 | Snavely et al. | 75/0.05 |
| 4,382,822 | 5/1983 | Mayer | 106/456 |
| 4,631,089 | 12/1986 | Kademachers et al. | 106/456 |
| 4,701,221 | 10/1987 | Brunn et al. | 106/456 |
| 4,702,775 | 10/1987 | Ostertag et al. | 106/459 |
| 4,753,680 | 6/1988 | Burow et al. | 106/456 |

OTHER PUBLICATIONS

Chemical Abstracts, vol. 99, No. 26, p. 141, "Formation Process of Magnetite by Reaction Between Iron(III) Hydroxide and Iron(II) Sulfate".
6001 Chemical Abstracts, vol. 99 (1983) Dec., No. 26, Columbus, Oh., U.S.A., p. 141, Abstract Nr. 214873e.

*Primary Examiner*—William R. Dixon, Jr.
*Assistant Examiner*—Willie J. Thompson
*Attorney, Agent, or Firm*—Connolly and Hutz

[57] ABSTRACT

Pigments for printing inks and magnetic toners are iron oxide pigments with a rhombic dodecahedral form and an average particle diameter of from 0.05 to 3.0 μm with a standard deviation of the particle size distribution of ±30%.

9 Claims, 1 Drawing Sheet

100

111

110

IRON OXIDE PIGMENTS, A PROCESS FOR THEIR PREPARATION AND THEIR USE

The present invention relates to novel iron oxide pigments, to a process for their preparation and to their use.

BACKGROUND OF THE INVENTION

Pigments based on magnetite ($Fe_3O_4$) having particle sizes in the range of from 0.1 to 2.0 μm have become widely used. As black coloring pigments they serve to color building materials and lacquers. Their magnetic properties are made use of in one-component toners for photocopiers. For obtaining optimum properties, pigments are generally required to have a very narrow particle size distribution. Such pigments have excellent coloring properties and the magnetic properties demanded by manufacturers of toners, such as high saturation and low coercive field strengths.

The preparation of such pigments is therefore an important objective of development. The processes by which such pigments may be prepared have been amply described.

DE-A No. 900 257, for example, describes the so called precipitation process in which iron-II salts are reacted with atmospheric oxygen in the presence of alkalies to produce $Fe_3O_4$ pigments.

Another variation is provided by the two stage precipitation process, in which, as indicated in U.S. Pat. No. 2,631,085, an iron-III oxide or iron-III hydroxide is reacted with iron-II salts with the addition of alkalies to yield magnetite pigments.

$Fe_3O_4$ pigments with very good coloring properties and the desired magnetic values may be obtained by this process. Such pigments are also distinguished by their narrow particle size distribution. Under suitable oxidation conditions, $\gamma$-$Fe_2O_3$ pigments, Bertholoid compounds and iron oxide red pigments ($\alpha$-$Fe_2O_3$) may be obtained from the aforesaid pigments with preservation of their form.

Magnetite crystallizes in a cubical system with a spinel structure of the structural type $O_h7$. The formation of the crystal surfaces (100) results in cubical crystals while the (111) crystal surfaces result in octahedral forms such as have hitherto been observed in magnetite pigments. No definite crystal surface develops if the pigment particles are irregularly formed.

In the above mentioned Patent Specifications, the crystal form is described as cubical, octahedral or irregular. By virtue of their geometry, these pigments can obtain a surface/volume ratio of $>1.18$.

When the pigments are used for coloring lacquers, the specific requirement for binder depends in the last analysis on the surface/volume ratio. Smaller ratios are aimed at in principle.

It is an object of this invention to provide iron oxide pigments which have a lower surface/volume ratio for a given particle size than the pigments known in the art.

BRIEF DESCRIPTION OF THE INVENTION

It has now surprisingly been found that iron oxides of a quality suitable for pigments may also be obtained in the form of rhombic dodecahedrons. This invention thus relates to iron oxide pigments having the form of rhombic dodecahedrons and an average particle diameter of from 0.05 to 3.0 μm with a standard deviation of the particle size distribution of ±30%. Iron oxide pigments with an average particle diameter of from 0.1 to 2.0 μm are especially preferred. The iron oxide pigments according to the invention are further characterised in that they are magnetite pigments with a development of the (110) crystal surfaces.

BRIEF DESCRIPTION OF THE DRAWING

The drawing illustrates three crystalline forms or shapes including cubic (100), octahedral (111) and rhombic dodecahedral (110).

DETAILED DESCRIPTION OF THE INVENTION

Figure 1:
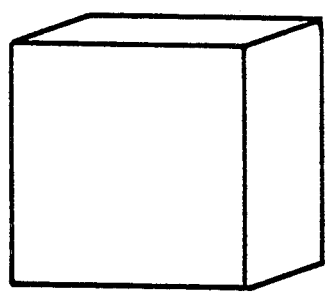
Figure 2:
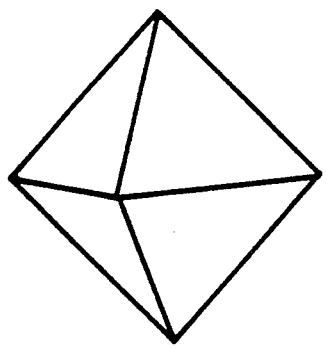
Figure 3:
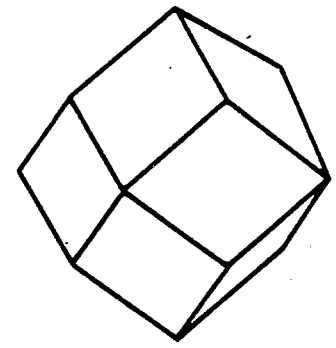

Iron oxide pigments of the crystal form and size of the present invention have not previously been known.

The rhombic dodecahedral form has hetherto only been known in natural mineral magnetite or relatively large monocrystals drawn from the melt but not in synthetic iron oxide pigments. The iron oxide pigments according to the invention may advantageously contain divalent and trivalent cations selected from Zn, Mn, Ni, Co, Ca, Al, Cr, Ti, V and Ga in quantities of from 0.1 to 10% by wight for modifying their coloring or magnetic properties.

Finely divided pigments require different quantities of dispersing agents and binders for processing, depending on their specific surface area and particle geometry. The lowest specific requirement may be expected in the most nearly spherical particles, as these have the smallest surface area for their volume. The rhombic dodecahedron is closest to a sphere, compared with cubs and octahedrons. Using a surface/volume ratio of 1 as reference, the ratio for a rhombic dodecahedron is 1.11, for an octahedron 1.18 and for a cube 1.24.

The present invention also relates to processes for the preparation of the iron oxide pigments according to the invention. Finely divided $Fe_3O_4$ pigments composed of particles of rhombic dodecahedrons with the required narrow particle size distribution may be prepared by the so called two stage precipitation process under the following reaction conditions. One important factor is the pH measured with a glass electrode in the suspension when the ferric hydroxide reacts with iron-II salts. If this pH is kept within the range of from 5.8 to 6.2 during the whole reaction time, which may be achieved by adjusting with alkalies, then finely divided iron oxide black pigments with a rhombic dodecahedral particle form are obtained. Even at a pH of only 7.0 the iron oxide pigment formed is found to consist exclusively of magnetite with a cubical crystal habit. This invention thus relates to a process for the preparation of the iron oxide pigments according to the invention, characterised in that iron-II salts are reacted with iron-III oride-hydroxide compounds with the addition of alkali metal hydroxide under such conditions that the pH of the suspension is maintained at 5.8 to 6.2 during the whole reaction time at reaction temperatures of from 50° to 100° C., preferably from 80° to 95° C.

Alkali metal carbonate solutions may be used instead of alkali metal hydroxide solutions. The iron oxide pigments according to the invention are then again obtained, depending on the precipitation temperature. The temperature of the ferric hydroxide suspension must in this case be kept below 80° C. during precipitation. At temperatures above 80° C. cubical pigments with chamfered-off edges are formed. Another preferred method of carrying out the process according to the invention therefore consists in reacting iron-II salts with iron-III oxide-hydroxide compounds and carrying out the precipitation with alkali metal carbonates at temperatures below 80° C. It is particularly preferred to add the alkali metal carbonates at temperatures below 80° C. and then continue the reaction at 80° to 95° C.

Both variations of the process according to the invention enable the magnetites according to the invention with a narrow particle size distribution to be obtained. The process carried out with exact pH control preferentially yields pigments with a particle diameter of from 0.1 to 0.5 μm. When the carbonate precipitation process is employed at a specified temperature, the products obtained are mainly magnetite pigments with a particle size of from 0.5 to 2.0 μm.

The pigments according to the invention may be oxidized with preservation of their form at temperatures from 200° to 400° C. to give rise to $\gamma$-$Fe_2O_3$ or to Bertholoid systems, depending on the oxidation conditions. If oxidation is carried out at higher temperatures, rhombic dodecahedral $\alpha$-$Fe_2O_3$ pigments are obtained.

Owing to their properties described above, the iron oxide pigments accoding to the invention are eminently suitable for the production of printing inks and magnetic toners. They may also be used for the preparation of frits or abrasives. The invention therefore also relates to the use of the iron oxide pigments according to the invention for the preparation of printing inks, magnetic toners, frits and abrasives.

The invention is described below with the aid of examples which do not, however, limit the invention. In particular, the man of the art can easily find other variations of the process according to the invention by modifying the other known processes for the preparation of iron oxide pigments within the framework of the above stated reaction conditions of pH, precipitating agent and temperature.

For further clarification, the crystal types cubic (100), octahedral (111) and rhombic dodecahedral (110) are illustrated schematically in FIG. 1.

COMPARISON EXAMPLE 1

15 liters of a suspension of $\alpha$-FeOOH (40 g/l) in an aqueous $FeSO_4$ solution (48 g/l) in which the ratio of $Fe^{III}$:$Fe^{II}$ is 1.4 are adjusted to pH 7.0 with about 1.8 liters of sodium hydroxide solution (150 g/l) in a 30 liter stirrer vessel with stirring (1600 revs per min) under inert conditions ($N_2$). The suspension is homogenised for 30 minutes and then heated to 80° C. for 30 minutes, during which the pH is kept constant at 7.0.

The reaction time is 1.5 hours.

Stirring is then continued for 1 hour without $N_2$ with the apparatus open.

The NaOH consumption is 2.6 liters, (corresponding to 103% of the theoretical).

Filtration and washing are followed by drying at 40° C.

The magnetite obtained is cubical.
Particle size 0.3 μm.
Specific surface area 4.2 m²/g.
Coercive field strength 63 Oe=5.01 kA/m.

COMPARISON EXAMPLE 2

15 liters of a suspension of $\alpha$-FeOOH (65 g/l) in an aqueous $FeSO_4$ solution (57 g/l) in which the $Fe^{III}$:$Fe^{II}$ ratio is 1.95 are heated to 90° C. with stirring (1600 revs per min) in a 30 liter stirrer vessel under inert conditions ($N_2$) and the quantity of $Na_2CO_3$ (3.01; 200 g/l) required for precipitation is added in 10 minutes. The reaction mixture is stireed for 5 hours and the pH is then adjusted to 9.5 with sodium hydroxide solution (400 g/l) and stirring is continued for a further 4 hours. The NaOH consumption is 450 ml. Stirring is then continued for 1 hour without $N_2$ and with the apparatus open.

After filtration and washing, the product is dried at 40° C.

The magnetite obtained is cubical with chamfered edges.
Particle size 1.5 μm.
Specific surface area 1.9 m²/g.
Coercive field strength 43 Oe=3.42 kA/m.

COMPARISON EXAMPLE 3

15 liters of a suspension of $\alpha$-FeOOH (45 g/l) in an aqueous $FeSO_4$ solution (41 g/l) in which the $Fe^{III}$:$Fe^{II}$ ratio is 1.9 are heated to 70° C. with stirring (1600 revs per min) in a 30 liter stirrer vessel under inert conditions ($N_2$) and a mixture of $Na_2CO_3$(1075 ml; 200 g/l) and NaOH (810 ml; 200 g/l) in the form of an aqueous solution is added in 8 minutes in the quantity required for precipitation.

The reaction mixture is then heated to 90° C. in 60 minutes and stirred for 4 hours.

With the apparatus open, stirring is continued for 1 hour without $N_2$.

Filtration and washing are followed by drying at 40° C.

The magnetite obtained is in a transitional form between cubes and rhombic dodecahedrons.
Particle size 0.3 μm.
Specific surface area 4.9 m²/g.
Coercive field strength 77 Oe=6.13 kA/m.

EXAMPLE 1

15 liters of a suspension of $\alpha$-FeOOH (31 g/l) in an aqueous $FeSO_4$ solution (32 g/l) in which the $Fe^{III}$:$Fe^{II}$ ratio is 1.7 are heated to 95° C. with stirring (1600 revs per min) in a 30 liter stirrer vessel under inert conditions ($N_2$). The pH of the suspension is adjusted to 6.0 with the addition of sodium hydroxide solution (90 g/l). The pH is kept constant at 6.0 during the reaction by the addition of further sodium hydroxide solution.

The reaction time is 5.5 hours.

With the apparatus open, stirring is then continued for 1 hour without $N_2$. The NaOH consumption is found to be 3.03 liters (corresponding to 108% of theoretical).

Filtration and washing are followed by drying at 40° C.

The magnetite obtained is rhombic dodecahedral.
Particle size 0.4 μm.
Specific surface area 3.6 m²/g.
Coercive field strength 36 Oe=2.86 kA/m.

EXAMPLE 2

15 liters of a suspension of $\alpha$-FeOOH (58 g/l) in an aqueous $FeSO_4$ solution (50 g/l) in which the $Fe^{III}$:$Fe^{II}$ ratio is 2.0 are heated to 70° C. with stirring (1600 revs per min) in a 30 liter stirrer vessel under inert conditions ($N_2$) and 2.62 liters of sodium carbonate solution (200 g/l) are added in 10 minutes.

The reaction mixture is then heated to 90° C. in 60 minutes and stirred for a further 4 hours.

The pH is then adjusted to 9.5 with about 790 ml of sodium hydroxide solution (200 g/l) and stirring is continued for a further 4 hours.

With the apparatus open, stirring is continued for 1 hour without N2.

Filtration and washing are followed by drying at 40° C.

The magnetite obtained is rhombic dodecahedral.

Particle size 1.5 μm.

Specific surface area 2.1 m²/g.

Coercive field strength 48 Oe=3.82 kA/m.

What is claimed is:

1. Iron oxide pigments with a rhombic dodecahedral form and an average particle diameter of from 0.05 to 3.0 μm with a standard deviation of the particle size distribution of ±30%.

2. Iron oxide pigments according to claim 1 having an average particle diameter of from 0.1 to 2.0 μm.

3. Iron oxide pigments according to claim 1 which are magnetite pigments with a formation of (110) crystal surfaces.

4. Iron oxide pigments according to claim 3 having an average particle diameter of from 0.1 to 2.0 μm.

5. Iron oxide pigments according to claim 3 which contain divalent and trivalent cations selected from the group consisting of Zn, Mn, Ni, Co, Ca, Al, Cr, Ti, V and Ga in quantities of from 0.1 to 10% by weight.

6. Iron oxide pigments according to claim 5 having an average particle diameter of from 0.1 to 2.0 μm.

7. Process for the preparation of iron oxide pigments according to claim 1 which comprises reacting iron-II salts with iron-III oxide-hydroxide compounds with the addition of sufficient alkali metal hydroxide or alkali metal carbonate such that the pH of the suspension is maintained at 5.8 to 6.2 during the entire reaction time at a reaction temperature of from 50° to 100° C.

8. Process according to claim 7 wherein iron-II salts are reacted with iron-III oxide-hydroxide compounds with addition of alkali metal carbonate at temperatures below 80° C.

9. Process according to claim 8 wherein the addition of alkali metal carbonate is carried out at temperatures below 80° C. and the subsequent reaction is carried out at 80° to 95° C.

* * * * *